Patented Aug. 22, 1950

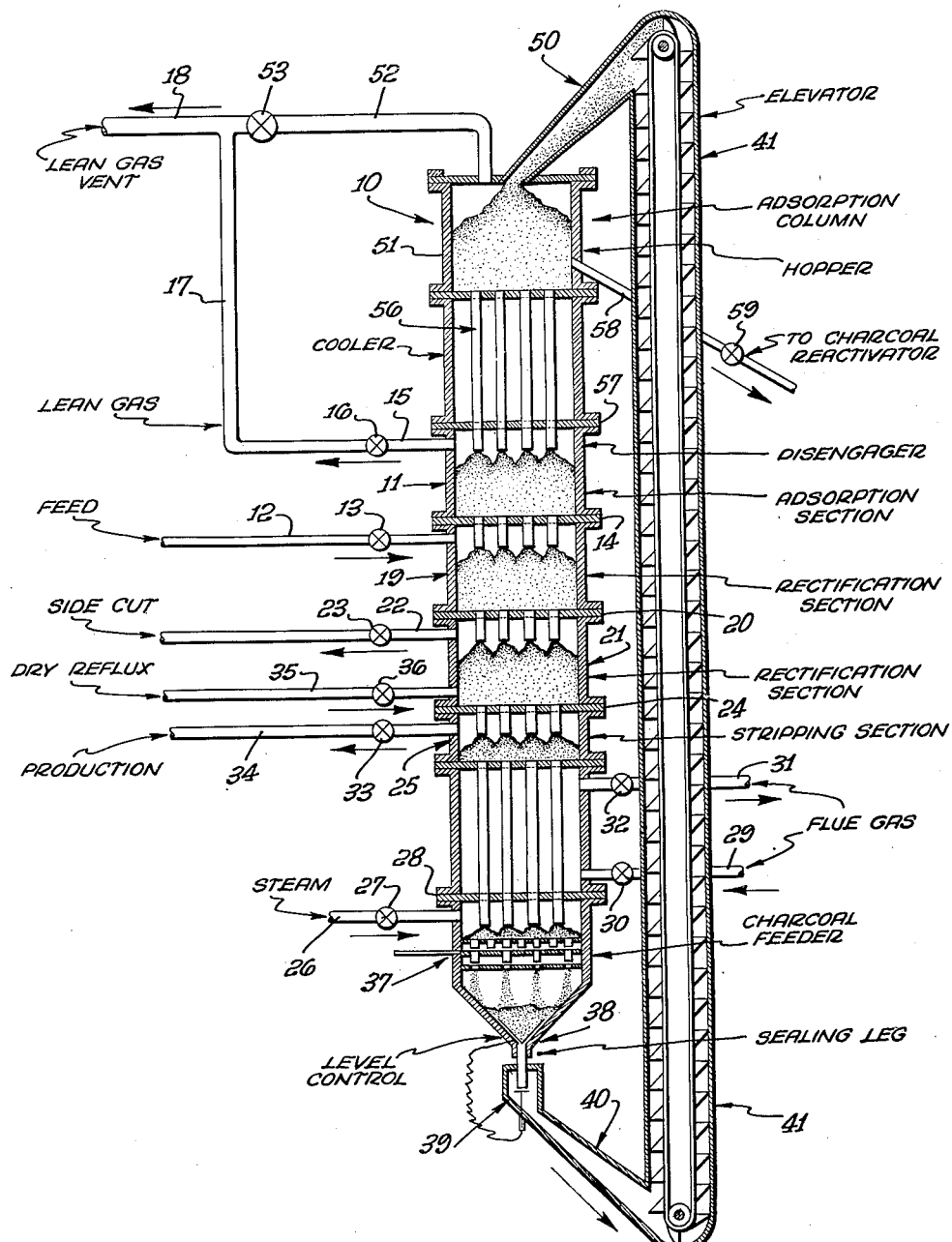

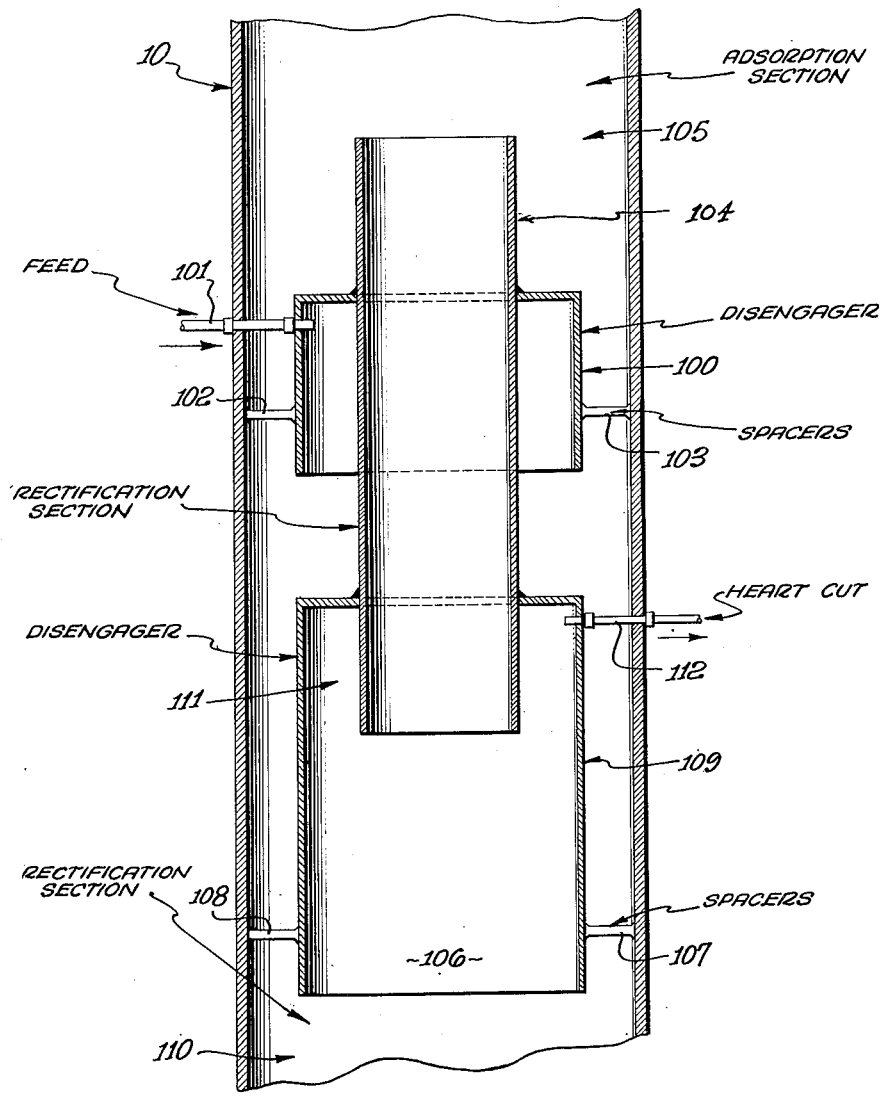

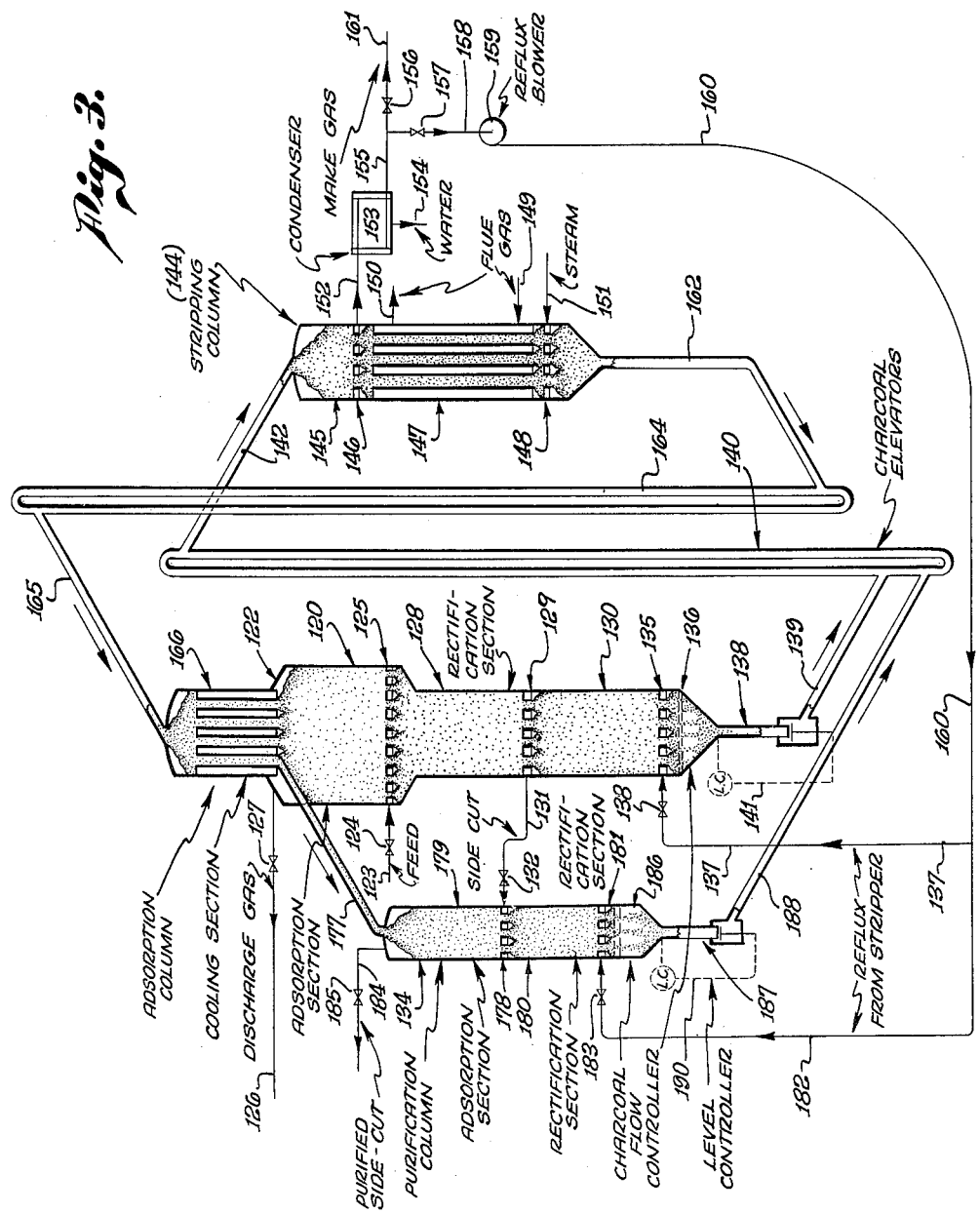

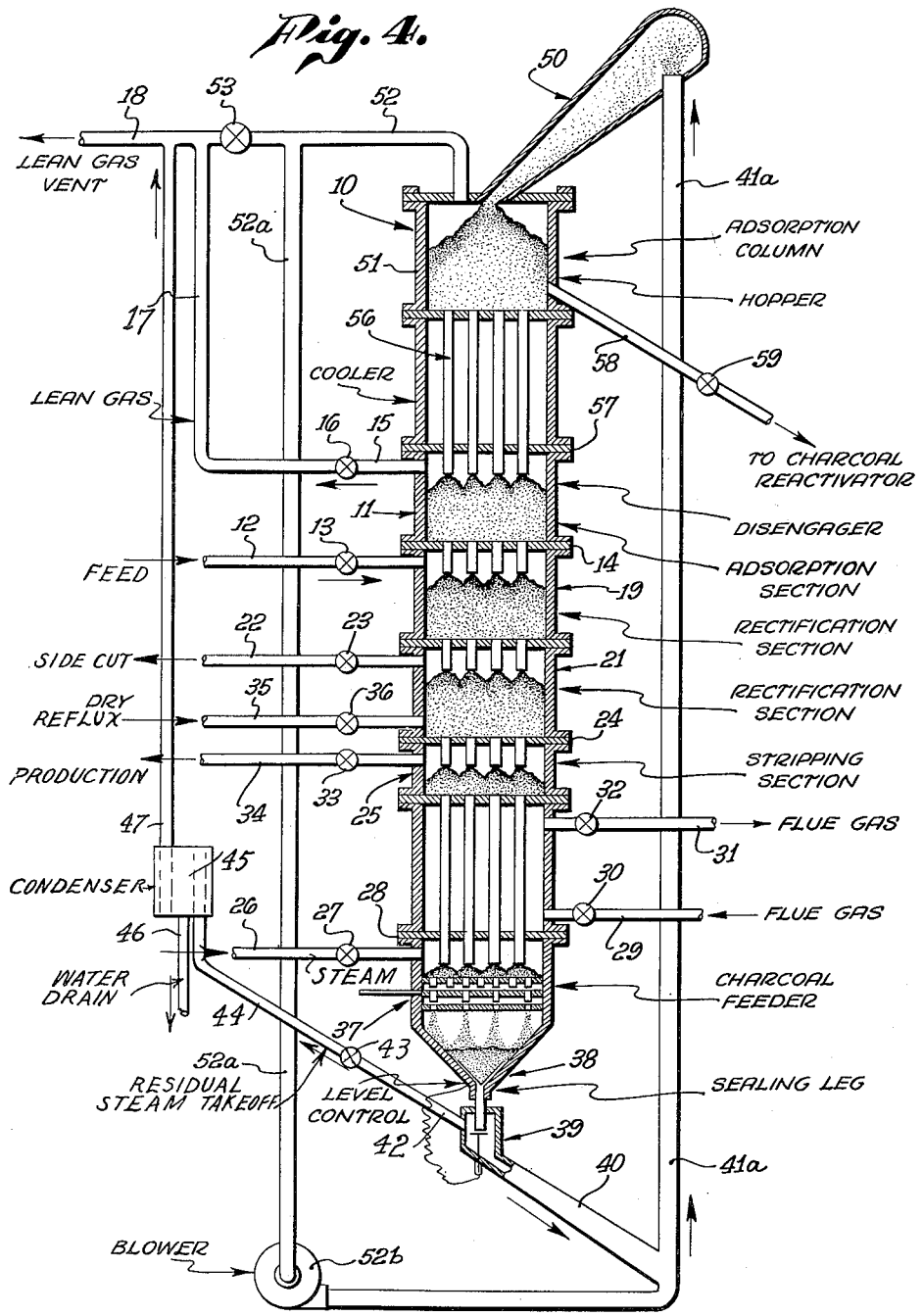

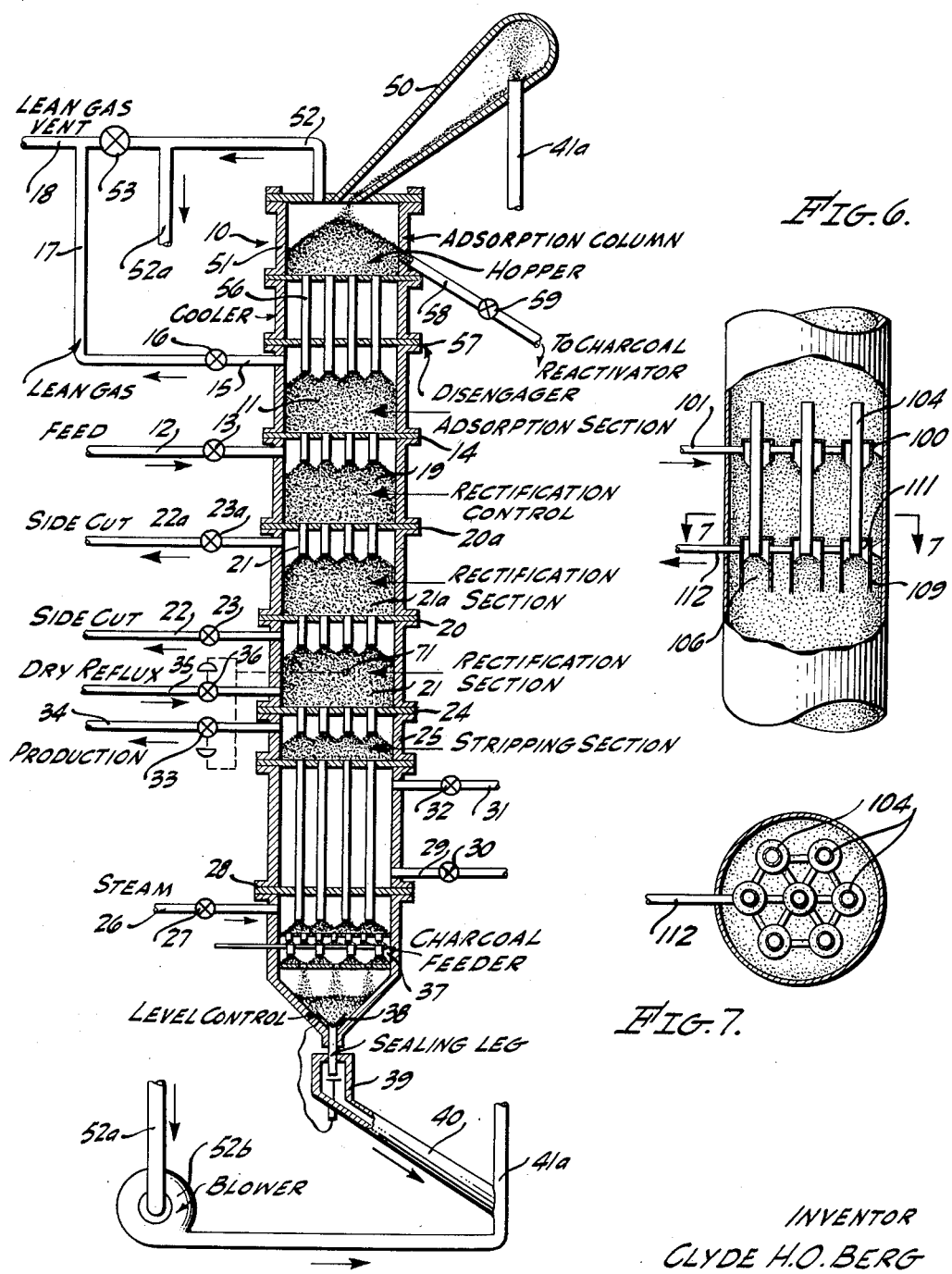

2,519,873

UNITED STATES PATENT OFFICE 2,519,873

ADSORPTION PROCESS AND APPARATUS

Clyde H. O. Berg, Long Beach, Calif., assignor to Union Oil Company of California, Los Angeles, Calif., a corporation of California Application September 24, 1945, Serial No. 618,346

39 Claims. (Cl. 183—4.2)

This invention relates to the separation of gaseous mixtures by selective adsorption of certain of the components of such mixtures on solid adsorbents and applies particularly to the separation of gaseous mixtures comprising hydrocarbons by selective adsorption on granular charcoal.

Gaseous mixtures containing valuable hydrocarbons in admixtures with flue gases in large amounts are encountered in many processes, such as for example the precombustion cracking process for the production of butadiene for use in synthetic rubber, resins, etc. In this process, a hydrocarbon feed stock such as a crude gasoline fraction is cracked by admixture with extremely hot combustion gases. Upon cooling the resulting mixture to atmospheric temperature, and separating the liquid condensate, a gaseous mixture is obtained which contains a large proportion of flue gas admixed with normally gaseous hydrocarbons and some normally liquid hydrocarbons. Modifications of conventional adsorption processes can be used to extract the bulk of the normally liquid hydrocarbons and even a large proportion of the $C_4$ hydrocarbons, but it is generally uneconomical to operate at sufficiently high pressures or sufficiently low temperatures to recover any substantial proportion of the $C_2$ and $C_3$ hydrocarbons. Consequently, these hydrocarbons, which may contain a high proportion of potentially valuable olefins, such as ethylene, propylene, acetylene, and the like, are either wasted or employed as low-value fuel gas. The present process is particularly applicable to the separation of normally gaseous mixtures and particularly gaseous mixtures of hydrocarbons containing five carbon atoms or less.

It is known that certain solid adsorbents such as for example activated charcoal or silica gel will adsorb some gases such as water vapor, benzene vapor, butane, and the like, more readily than they will other gases, such as hydrogen, nitrogen, methane, and the like, and that by heating the enriched adsorbent containing the adsorbed gases these gases may be liberated substantially completely and the adsorbents after being cooled again are capable of further selective adsorption. This has led to the development of various processes for separation of gases involving adsorption on solid adsorbents, heating the enriched adsorbents to liberate the adsorbed gases and cooling the thus regenerated adsorbent for further use. The present invention involves a process of this type which constitutes an improvement over any previous process described in that it affords greater efficiency of separation as well as greater simplicity of operation.

In general the process of separating gaseous mixtures by selective adsorption on granular charcoal involves the steps of countercurrently adsorbing certain components of the gaseous mixture in a bed of charcoal, preferably in a moving bed of charcoal, the enriched or saturated charcoal flowing from the adsorption zone through one or more rectification zones as hereinafter described and into a stripping section wherein the gaseous components are desorbed from the charcoal by means of heat and steam or other stripping gas. From the stripping section the charcoal passes through a sealing leg into a conveying system wherein it is carried to the top of the adsorber and from thence through a cooling section back into the adsorbing section to complete the cycle. Various modifications may be employed which are described in greater detail hereinafter.

Thus in the conventional process of selective adsorption, a gaseous fraction such as a hydrocarbon fraction is divided into two separate fractions, one enriched in higher molecular weight components and the other enriched in the lower molecular weight components, the former being obtained as the adsorbate from the stripping section and the latter, passing through the adsorption section, being preferentially desorbed by the higher molecular weight components.

It is an object of my invention to provide an improvement in the art of selective adsorption whereby a specific fraction or heart cut may be isolated from a gaseous mixture in one adsorption column thereby eliminating the necessity of a two-stage operation in order to obtain an equivalent heart cut.

It is a further object of my invention to provide an apparatus which may be included in an adsorption column to aid in the efficiency of the side cutting or heart cutting operation as hereinafter described.

Other objects and advantages of my invention will become apparent to those skilled in the art as the description thereof proceeds.

I have found that it is possible to employ a side cutting operation in a countercurrent adsorption process to obtain a fraction of the feed enriched in certain of the intermediate components thereof. In the resolution of a normally gaseous hydrocarbon fraction containing $C_1$, $C_2$, $C_3$ and $C_4$ paraffins and $C_2$, $C_3$ and $C_4$ olefins in the conventional selective absorption process employing a solid adsorbent, it is possible to resolve two components—one enriched in the higher molecular weight hydrocarbons and the other enriched in the lower molecular weight hydrocarbons, the dividing point being a function of the ratio of charcoal and feed stock, charcoal flow rate through the column and the like.

By the process of my invention I am able to improve upon this type of separation by obtaining from such a fraction in one adsorption column or in one adsorption operation a heart cut consisting predominantly of any one or group of components in the feed, the particular component or components in the heart cut being a function of the various operational variables employed. Thus I may feed to a countercurrent, continuous moving bed, charcoal adsorption column a gaseous mixture as described and obtain as the lean gas from the adsorption zone, methane and any gases of lower critical temperature such as nitrogen, oxygen and the like and from an intermediate zone a fraction rich in the $C_2$ hydrocarbons, namely ethane and ethylene and as the product gas from the stripping section, the residual hydrocarbons including the $C_3$ and the $C_4$ hydrocarbons. Further, by successive stages more than one side cut may be obtained wherein a second or predominantly $C_3$ fraction could be separated, for example, from the above mentioned feed.

The primary elements of my invention are illustrated in Figures 1, 2, 3, 4, 5, 6 and 7. In Figure 1 an apparatus is shown similar to the conventional countercurrent adsorption apparatus but differing therefrom in certain particulars so as to make possible the separation of a heart cut as hereinafter described. An apparatus to be included in an adsorption column to permit the recovery of a side cut of high purity is shown in Figure 2, and in Figure 3 various modifications of the process of our invention including side cut purification, and separated steam stripping are illustrated.

Figure 4 shows a modification of the charcoal conveyance system.

Figure 5 shows another modification of Figure 1 in which two side cuts may be obtained; and Figures 6 and 7 show a modification of Figure 2 in which tube bundles are used, Figure 7 being a cross sectional view taken along 7—7 of Figure 6.

Referring to Figure 1, feed gas which for the purposes of this description may be predominantly a mixture of $C_1$, $C_2$ and $C_3$ hydrocarbons including olefins and paraffins is introduced to the adsorption section 11 of adsorption column 10 by means of line 12 controlled by valve 13 and is distributed within the adsorption section 11 by means of disengager 14. A solid bed of granular charcoal is caused to flow downwardly through the adsorption column at such a rate that substantially all of the $C_2$ and heavier hydrocarbons are adsorbed in the charcoal in the adsorption section 11 while methane and lower boiling gases pass upwardly therein, a part of which are withdrawn from the adsorption section by means of line 15 controlled by valve 16 and pass through line 17 into the lean gas vent 18.

The saturated charcoal passes from adsorption section 11 through disengager 14 into rectification section 19 wherein equilibrium is established between the methane and lighter gases which may have been adsorbed and the $C_2$ and heavier hydrocarbons by refluxing the charcoal with $C_2$ hydrocarbons which are released from the charcoal at a point lower in the column. Thus in rectification section 19 any residual methane or lighter gases which may have been adsorbed by the charcoal passing downwardly through disengager 14 are desorbed by virtue of the selective adsorption of the $C_2$ hydrocarbons which are caused to pass upwardly through disengaging section 20 into rectification section 19. The charcoal substantially free of such lighter components passes from rectification section 19 through disengaging section 20 into a secondary rectification section 21. In section 21 the charcoal is refluxed with the heavier components of the feed, i. e., $C_3$ and $C_4$ hydrocarbons to effect the desorption of the $C_2$ hydrocarbons, the level of $C_3$—$C_4$ reflux being controlled at a given point within the rectification section as shown in Figure 5 by means of a temperature control point 71 within the section to measure the heat of adsorption of the $C_3$ and $C_4$ hydrocarbons and to control the reflux inlet valve. By injecting or otherwise introducing $C_3$ and $C_4$ hydrocarbons into the rectification section 21 to serve as reflux therein the $C_2$ hydrocarbons are desorbed due to the preferential adsorption of the heavier hydrocarbons and the desorbed $C_2$ hydrocarbons migrate upwardly in the section insuring thereby the continued retention on the charcoal, flowing downwardly from rectification section 19, of the heavier components. In this manner a $C_2$ heart cut may be withdrawn from the top of rectification section 21 by means of line 22 controlled by valve 23 which is comparatively free of either lighter or heavier components.

To further insure the production of a side cut containing a minimum of lighter components as impurities, valve 23 is so controlled that a portion of the $C_2$ hydrocarbons desorbed in rectification section 21 are forced to pass upwardly through disengaging section 20 into initial rectification section 19 therein furnishing reflux for the down flowing charcoal to insure a substantially complete removal of the methane and lighter gases.

The charcoal substantially free of $C_2$ hydrocarbons and lighter gases passes from rectification section 21 through disengager 24 into the steam stripping section 25. In this section steam is introduced by means of line 26 controlled by valve 27 at disengager 28 and flows upwardly through a fire heated tube bundle to the stripping sections. The tube bundle is heated by means of hot combustion gases or the like which are introduced by means of line 29, controlled by valve 30 and withdrawn from the tubular heater by means of line 31 controlled by valve 32. In this section the $C_3$ and heavier hydrocarbons and any residual $C_2$ or lighter gases which may be still adsorbed on the charcoal are stripped from the charcoal together with the steam and are withdrawn by means of line 33 controlled by valve 34.

It should be pointed out that the majority of the stripping is actually accomplished in that part of the stripping section which lies above the tube bundle charcoal heater and as a result the actual stripping temperatures are considerably lower than the temperature to which the charcoal is heated in the tubular heater thus minimizing the amount of polymerization or other undesirable reactions which might take place at the higher temperature. If the stripped components are dried prior to use as reflux in the column higher steam rates may be employed whereby the temperatures may be reduced even farther with no sacrifice in efficiency of the stripping.

Thus the higher the steam rates permissible on the basis of the adsorption column design the lower will be the necessary stripping temperature and the less polymerization of any olefins or diolefins that may be in the stripped components will occur resulting in a longer charcoal life before reactivation becomes necessary. These C₃ and heavier hydrocarbons employed as reflux are dried by condensation of the steam and separation thereof from the hydrocarbons and are reintroduced in the adsorption column at a point in rectification section 21 directly above disengager 24 by means of line 35 controlled by valve 36 to serve therein as reflux.

Many modifications in the operation and in the design of the adsorption unit may be employed without departing from the present invention which comprises an innovation in the art of selective adsorption whereby in one adsorption operation one or more heart cuts may be obtained from a mixed gaseous feed. Thus it may be desirable to split the operation separating the processes of adsorption and stripping into two separate columns wherein the heart cut will be obtained in the first column by means of introducing the heavier components obtained in the stripping column as reflux to effect the desorption of the intermediate components as described above. Again it is preferable to remove the steam or other stripping gas which may be employed from the heavier components stripped from the charcoal prior to using a portion of these as the necessary reflux to obtain the heart cut. Such a separate stripping operation would be of advantage primarily in that a reduction in the required charcoal circulation rate would be effected due to the decrease in the charcoal temperature in the lower rectification zone. The adsorptive capacity of the charcoal is a direct function of its temperature and any reduction in temperature will effect an increase in the charcoal efficiency. Further advantages of this type of operation include lower total heat requirements, lower construction costs as a result of the reduction of the heating and cooling costs and of the rate of charcoal circulation, and more accurate control of temperature conditions within the various sections of the column relating to the adsorption and desorption of the gases.

Another modification of the adsorption process which may be employed without departure from the principles of the present invention is the use of a gas lift charcoal conveyance system as shown in Fig. 4 in place of the charcoal elevator as described. In a gas lift system the charcoal from transfer line 40 is picked up by a high velocity stream of gas such as lean gas from the process, furnished by a blower, and is carried in a vertical pipe 41a to the top of the column where it is separated from the gas and deposited into a cooler or hopper in much the same manner as described. The gas may then be recirculated by means of line 52a to the blower. These and other variations may be employed in the adsorption plant in which the process and apparatus of our invention is employed.

In an alternative method of furnishing heavy hydrocarbon reflux to rectification section 21 as shown in Figure 5 the take off valve 33 in line 34 may be so controlled as to force a portion of the products from the stripping section; i. e., steam and hydrocarbons, predominantly C₃ and C₄ hydrocarbons, counter-currently to the charcoal flow through disengager 24 into the rectification section. There are, however, certain inherent disadvantages to this, what might be termed, "direct return reflux" paramount among which are the dilution of the hydrocarbons which give the most efficient refluxing action and moistening of the charcoal by a partial condensation of the steam which has the effect of impeding the free flow of the charcoal through the tubes in disengager 24 due to the tendency of the charcoal particles to adhere to each other or agglomerate when they become wet.

For these reasons we have found that decidedly improved results could be obtained by removing the entire production from the stripping section, thus preventing any substantial flow back through disengager 24, separating the stripping steam from the hydrocarbon gases and returning the latter as substantially dry reflux to the lower portion of rectification section 21. This dry reflux return as represented in the drawing by line 35 controlled by valve 36 may be made in any desired manner such as by means of a spider located in the lower section of rectification section 21 slightly above the disengaging section 24. These particular methods of reintroduction of the dry reflux are only illustrative of possible modes of operation and should not be construed as limiting the present invention in any of its aspects.

The charcoal flowing through the disengaging section 24 passes through the stripping section 25 as described, through the combustion gas-heated tube bundle into the lower portion of the adsorption column. It is at this point that the rate of flow of the charcoal through the column is most conveniently controlled. Any desired means of controlling this flow may be employed such as a rotating vane or the apportioning means as shown or the like. The charcoal passes through the feeder 37 into sealing leg 38, the length of which is dependent upon the type of feeder or flow regulator employed. In the drawing, a level control 39 is shown whereby the length of the sealing leg may be kept at a minimum by virtue of the fact that a build-up of charcoal can be induced in the bottom of the adsorption column. The charcoal is released by the level control 39 flowing through transfer line 40 into the charcoal elevator 41.

The drawing shows the use of a particular type of charcoal feeder which permits substantially the complete removel of any steam accompanying the charcoal into the sealing leg by permitting the steam to escape through line 42 controlled by valve 43 and through line 44 into condenser 45. In the condenser the steam is separated from any gas which may be present and is withdrawn as water from the condenser by means of line 46, the gas passing through line 47 to the lean gas vent 18.

The charcoal flowing through transfer line 40 is picked up by elevator 41, carried to the top of adsorption column and deposited in the transfer line 50 falling therefrom into hopper 51. A major portion of charcoal in hopper 51 passes through cooler 56 wherein it is cooled to the desired temperature before passing through disengager 57 into adsorption section 11. Line 58 controlled by valve 59 is provided whereby charcoal may be withdrawn from hopper 51 when desired to be reactivated for reuse in the process.

The charcoal is further dried by controlling valve 16 on the lean gas drawoff line 15 from the adsorption section 11 so that a portion of the lean gas is forced to flow through the cooling tubes in cooler 56 countercurrently to the charcoal flow and through hopper 51 into lean gas exit line 52. It is to be understood that the primary element of my invention is a modification of the process of countercurrent selective adsorption on a solid moving bed adsorbent whereby it is possible to recover one or more side cuts consisting essentially of fractions enriched in certain components of the original feed stock. The value of this process with respect to efficiency of operation and elimination of excessive equipment which would be necessary to perform the same type of separation in conventional operation will be immediately obvious to those skilled in the art.

The efficiency of this side cutting may be more fully appreciated by reference to the following specific example:

EXAMPLE I

In one example of the process of the present invention an ethylene-ethane fraction was obtained from dry gas produced from a catalytic cracking operation. This separation or heart cut was obtained in one adsorption column as described rather than in a two-stage operation as has been heretofore necessary.

The feed to the unit contained approximately 35% methane, 40% ethylene, 8.2% ethane, 14.5% propylene-propane and traces of other gases including $C_4$ hydrocarbons, nitrogen and carbon dioxide. (All percentages herein refer to mol per cent.) Approximately 7,000 SCF (standard cubic feet) per day of this feed gas was charged to the adsorption section of the unit and the charcoal flow was maintained at 1,150 pounds per MSCF of feed per day. Approximately 2,470 SCF per day of lean gas was produced from the adsorption section and from the lean gas take off in the charcoal hopper, approximately 3,260 SCF of heart cut was produced from the secondary rectification section and approximately 1,240 SCF of make gas was obtained from the stripping section. The compositions of these three streams are given in Table 1 below:

Table 1

| Constituents | Composition, Mol Per Cent of Gas | | | |
| --- | --- | --- | --- | --- |
| | Feed | Lean Gas | Heart Cut | Make Gas |
| Methane | 34.9 | 94.0 | 1.3 | 2.0 |
| Ethylene | 40.0 | 1.4 | 76.1 | 4.3 |
| Ethane | 8.2 | | 13.7 | 1.1 |
| Propane-Propylene | 14.5 | 0.1 | 5.8 | 91.1 |

From these data it is apparent that by the process of my invention I am able, when separating a feed such as that described, to obtain a heart cut therefrom containing approximately 90 mol per cent of an ethane-ethylene fraction. Further, if appreciable butanes and butylenes were present in the feed together with methane, ethane, ethylene, propane and propylene the operation of the column could be controlled so as to obtain a heart cut rich in either the $C_2$ or the $C_3$ hydrocarbons as desired. Also as shown in Figure 5 by including a third rectification section 21a in a column as described, separated from the other two by a disengaging section 20a, and provided with gas take off means 22a and 23a, a second heart cut may be obtained so that both the $C_2$ and $C_3$ fractions may be isolated from the feed gases.

Whereas, the general principles of my invention have been described and illustrated with respect to conventional types of apparatus I have further found a particular type of apparatus which when included in the adsorption column permits the separation of a particular fraction of even higher purity than that shown in the above example. Essentially this apparatus as illustrated in Figure 2 comprises a combination of three tubes disposed within the adsorption column so as to form a disengaging section into which the gaseous feed may be introduced, three separate and distinct rectification sections for obtaining the purified heart cut and a secondary disengaging section for removing the heart cut from the adsorption column. In conjunction with this apparatus in the adsorption column are of course the necessary stripping and cooling section and disengagers separating these from the zone in which the side cutting apparatus of my invention is located. The improved heart cut or side cut is obtained as pointed out above by means of three tubes placed in the column, a primary tube of smaller diameter than the adsorption column and disposed vertically therein, a secondary tube separate from the primary tube and of substantially the same diameter as the primary tube although variation therefrom does not materially affect the efficiency of the process, and a third or tertiary tube of smaller diameter than either the primary or secondary tubes. The primary and secondary tubes are closed at their upper ends and open at their lower ends, the lower open end of the upper or primary tube being separated from the upper closed end of the lower or secondary tube by a distance of from about 6 inches to 10 feet or more depending upon the size of the equipment employed. The tertiary tube is of smaller diameter than the other tubes and is disposed within these tubes, the upper open end projecting above the upper closed end of the primary tube and the lower bottom end projecting below the upper closed end of the secondary tube. These three tubes are affixed to each other and to the adsorption column so that they remain in a stationary position within the column.

The structure and functioning of this side cutting apparatus may be more readily understood by reference to Figure 2 in which adsorption column 10 is a vertical cross section of a portion of an adsorption column such as that shown in Figure 1, wherein has been placed the apparatus to perform the side cutting operation of the present invention. The feed gas is introduced into the primary tube 100 by means of line 101. This tube 100, having an outside diameter substantially less than that of the adsorption column, is closed at the upper end and open at the lower end and forms a disengaging section by means of which feed gas is introduced. This primary tube is supported in the column by means of spacers such as 102 and 103. The feed gas passes downwardly in the disengaging section, out the bottom opening of the primary tube 100 and flows therefrom upwardly countercurrent to the charcoal bed flowing downwardly in the column. Another tube 104 referred to above as the tertiary tube having a diameter smaller than that of the primary tube 100 and being open at both ends penetrates the disengaging section extending upwardly through the closed end of the primary tube into the adsorption section 105 and downwardly into rectification section 106 which is formed by another tube 109 referred to as the secondary tube having a diameter substantially equal to that of the primary tube 100 and being closed at the top end, open at the bottom end and being supported in the column in a manner similar to that of the primary tube 100 by spacers 107 and 108. The tertiary tube 104 projects upwardly from the primary tube 100 into adsorption section 105, a distance which is sufficient to insure the adsorption of the heavier components of the feed prior to reaching the upper opening of this internal tube. For the sake of convenience the feed may be considered as consisting of light, intermediate and heavy components the intermediate components being those desired to be obtained as a heart cut. It is necessary as previously stated to insure the adsorption of substantially all of the heavy components in the downwardly flowing charcoal; that is, in the annular space between the disengaging section formed by primary tube 100 and the walls of adsorption column 10 or in the adsorption section 105 at a point below the upper opening of the tertiary tube 104, and at the same time to minimize the adsorption of the lighter components on the charcoal at a point below this opening. In this manner the charcoal flowing through tube 104; that is, entering at the upper end thereof will contain only the light components and a portion of the intermediate components.

That portion of the charcoal flowing through the annular spaces between primary tube 100 and secondary tube 109 will contain substantially all of the heavy components and a portion of the intermediate components and in some cases small amounts of the lighter components. In the adsorption column below rectification section 106, formed by the lower portion of tube 109, reflux of the heavy component is employed, as described in Figure 1, with reference to rectification section 21 in that figure, whereby the intermediate components are desorbed passing upwardly in the column a part of which will pass into the bottom end of the secondary tube 109 and a part into the annular space between rectifying section 106 and adsorption column 10. That portion of the intermediate fraction which passes upwardly in the annular space between the adsorption column 10 and the rectification section 106 will be readsorbed by the downwardly flowing charcoal and will be returned to the portion of the adsorption column below the lower opening of secondary tube 109. In this manner there will be a refluxing action by the intermediate components in the region between the lower end of secondary tube 109 and the upper end of the tertiary tube 104 which will substantially completely prevent the lighter components of the feed from migrating downwardly in the annular space between the adsorption column and the side cutting apparatus below the region of this refluxing action.

The intermediate components, desorbed by the heavier component reflux, which migrate into rectification section 106 will continue upwardly therein into the lower end of the tertiary tube 104 through which charcoal is flowing from the adsorption section. In this tube the intermediate components contact the downwardly flowing charcoal which is saturated with a mixture of the light components and intermediate components and thereby effects the desorption of the light components which migrate upwardly countercurrently to the charcoal flow. The charcoal flowing from the lower end of pipe 104 will therefore be saturated substantially completely with the intermediate components which will be again desorbed when the charcoal comes in contact with the heavier component reflux further down in the column.

By extending the lower end of the tertiary tube 104 below the top closure of secondary tube 109, the lower portion of which forms the rectification section 106 which is in fact a continuation of rectification section 110 in the adsorption column below pipe 109, a disengaging section 111 is formed from which the side cut may be taken. This disengaging section 111 is provided with an outlet pipe 112 projecting through the wall of adsorption column 10. A portion of the intermediate component flowing upwardly, countercurrently to the flow of charcoal in secondary tube 109 is withdrawn by means of pipe 112. This side cutting is controlled so that a portion of the intermediate component will be caused to flow upwardly in the tertiary tube 104 countercurrently to the downwardly flowing charcoal to serve as reflux as described.

By the use of this type of apparatus in a conventional adsorption column in which countercurrent selective adsorption is employed a higher degree of purity may be obtained in the side cut fraction than that obtained by the method employed in the first example and shown in Figure 1. Referring to Figure 1 the side cutting apparatus as described and illustrated in Figure 2 is placed in the central portion of the column between the cooler and the stripper eliminating disengaging section 14 which is replaced by the disengaging section formed by primary tube 100 in Figure 2, rectifying section 19 the function of which is replaced by the refluxing action within tertiary tube 104 and in the annular space between the apparatus and the adsorption column, and disengager 20 which is replaced by the disengaging section 111 formed by the extension of the tertiary tube 104 and the closure at the top of the secondary tube 109. Rectifying section 21 will be modified due to the extension of tube 109 into that zone of the column, the reflux taking place partially inside the lower end of tube 109.

In an alternative method of operation as shown in Figures 6 and 7 the side cut may be effected by employing numerous side cutting units as described within the adsorption column. Thus the diameters of the primary, secondary and tertiary tubes may be such that it is possible to employ any number of these units spaced on substantially the same plane, i. e., the openings, etc., of the respective tubes of each unit falling substantially within the same cross-sectional plane of the adsorption column. In this manner as many as 50 or 100 individual side cutting units may be employed within the column much in the manner of tube bundles all functioning to give the same side cut. Further than this these units may be employed singly or in groups in various levels of the adsorption column so as to obtain two or more heart cuts from the feed stock.

The dimensions of the tubes are of course a function of the number of side cut units employed, the design characteristics of the particular plant such as charcoal flow rates, feed rates, etc., and the like, and as a result the only limitations applicable vary with each of these variables. In general, however, it is necessary that the tertiary tube or tubes project sufficiently far into the charcoal bed above the primary tube or tubes so as to eliminate the possibility of the charcoal passing through the tertiary tube containing any substantial amount of components heavier than those in the desired heart cut. Similarly the secondary tube must extend downwardly in the column sufficiently far to prevent the passage of any substantial amount of components lighter than the heart cut fraction below the lower end of this secondary tube. Thus the length and diameter of these tubes will be interdependent and will be further dependent on the numerous process variables enumerated.

The effectiveness of the particular apparatus in permitting the production of a side cut of a high degree of purity may be evidenced by the following example in which the apparatus as shown in Figure 2 was employed inside the adsorption column as described.

EXAMPLE II

The feed stock to the unit was of substantially the same composition as that employed in Example I and comprised approximately 35% methane, 40% ethylene, 3.8% ethane, 20% propane-propylene and traces of other gases including $C_4$ hydrocarbons, nitrogen and carbon dioxide. (All percentages herein refer to mol per cent.) Approximately 7,000 SCF (standard cubic feet) per day of this feed gas was fed to the adsorption section of the unit and the charcoal was maintained at 1,150 pounds per MSCF. These conditions were chosen to duplicate those employed in Example I.

Approximately 2,520 SCF of lean gas was produced from the adsorption section and from the lean gas take off from the adsorption hopper; this latter production being that forced to flow countercurrently to the charcoal through the tubes of the cooling section.

Approximately 2,940 SCF of heart cut was obtained by means of the heart cut take off line 112 from the disengaging section formed by the projection of the tertiary tube 104 and the upper portion of pipe 109 and approximately 1,540 SCF of make gas, comprising the heavy components of the feed, was obtained from the make gas take off in the stripping section. The compositions of these streams are given in Table 2 below:

Table 2

| Constituents | Composition, Mol Per Cent of Gas | | | |
|---|---|---|---|---|
| | Feed | Lean Gas | Heart Cut | Make Gas |
| Methane | 35 | 97.1 | 0.2 | |
| Ethylene | 40 | 1.0 | 93.0 | 2.3 |
| Ethane | 3.8 | | 5.1 | 0.5 |
| Propane-propylene | 20 | 0.1 | 0.1 | 96.1 |

Each of these fractions contained 1% to 2% of contaminants such as carbon monoxide or carbon dioxide which are difficult to control in any adsorption process. However, it is seen that a heart cut fraction was obtained which contained better than 98% of ethylene and ethane which compares favorably with the heart cutting operation as used in Example I in which the heart cut fraction contained only about 90% of ethane and ethylene.

The charcoal employed in the above process is preferably granular, about 10 to 40 mesh, although sizes as large as about 4 mesh and as small as about 100 mesh may also be employed. By "charcoal" herein is meant carbon, animal or vegetable charcoal, and the like, although an activated form of carbon or charcoal is preferred. After long usage, small amounts of highly adsorbable materials may accumulate in the charcoal and impair its efficiency somewhat. The charcoal may then be withdrawn as provided in Figure 1 by line 58 from hopper 51 and can usually be reactivated by high temperature steam treatment.

The process of this invention may be employed for the separation of any mixture of gases, containing two components which are more readily adsorbable on charcoal than another component, into fractions, the fraction richer in the more readily adsorbable component being termed the make gas, and the fraction richer in the intermediate component being termed the heart cut.

The degree of adsorbability of gases on charcoal is generally higher for the gases of higher molecular weight. There appears to be a rough correlation between adsorbability and critical temperature. Thus, gases of low critical temperature, such as hydrogen, nitrogen, oxygen and carbon monoxide are adsorbed to a lesser degree than gases of higher critical temperature, such as chlorine, sulfur dioxide, hydrogen sulfide, ammonia, nitrous oxide, carbon dioxide and the like. Among the hydrocarbons there is a marked increase in adsorbability with molecular weight. Thus, the process may be employed for the separation of hydrocarbon vapors of higher molecular weight from those of lower molecular weight, as in the adsorption of natural gasoline from natural gas. It may also be used for purification or concentration of readily adsorbable gases, such as those sown, from mixtures in which they are contained.

The ratio of charcoal to feed gas required depends on the proportion of rich gas or highly adsorbable components in the feed and the degree of removal desired. As a possible explanation of its action, it appears that charcoal has a definite adsorptive capacity for each component of a gaseous mixture at a given temperature. When a given amount of fresh charcoal is contacted with feed gas, the charcoal adsorbs all components of the gas to at least a slight degree. Its capacity to adsorb the least readily adsorbable constituents of the gas is soon exceeded, however, and thereafter it will not adsorb further amounts of these constituents, but will continue to adsorb the more readily adsorbable components. As it approaches its adsorptive capacity for each more readily adsorbable component, furthermore, there is a definite displacement of the less readily adsorbable material by the more readily adsorbable material. Thus, for a feed gas containing $C_1$ to $C_4$ hydrocarbons including butadiene, mixed with nitrogen, the use of a high ratio of charcoal to feed gas would result in more complete recovery of total hydrocarbons as make gas, and the use of a limited amount of charcoal would result in the production of a smaller amount of a make gas of higher $C_4$ hydrocarbon or butadiene content.

There are many modifications of the above process which may be employed. Although granular charcoal of about 10 to 40 mesh is preferred, larger granules up to about 2 mesh may be employed in some instances, and finely ground or powdered charcoal of particle size as small as about 500 mesh may also be employed. When using the powdered charcoal, however, much more care must be exercised in the design of sealing legs, separators, etc. The use of finely powdered charcoal lends itself well to concurrent flow of stripping gas and charcoal, which is another modification applicable also to granular charcoal. When concurrent flow of stripping gas and charcoal is employed, especially with finely ground charcoal, the stripping may be accomplished by lifting the charcoal to a separator located at the top of a cooler while heating it at the same time. In another modification, the stripping gas may be sufficiently preheated to supply the bulk or all of the necessary stripping heat.

As was seen by the foregoing discussion and examples that a side cut may be produced from an adsorption unit according to the process and apparatus of our invention which is substantially free of lighter components but containing small amounts of heavier components since in the absence of the particular apparatus as shown in Figure 2 or some modification thereof the charcoal flowing downwardly in the column must, at the point of equilibrium, with the side cut contain some heavier components which will contaminate the side cut. Contamination is a function of the ratio of the components to be removed in the side cut to the components taken from the system as make gas. The lower this ratio the greater amount of impurities will be found in the side cut. However, this difficulty has been largely overcome by the usage of a tubular apparatus according to Figure 2 wherein the point of adsorption and desorption is controlled in such a manner that the charcoal in equilibrium with the side cut will be substantially free of contaminating heavier components.

However, in the absence of special apparatus the charcoal flowing normally through the column will be at equilibrium with the side cut inducing its contamination. We have discovered a simple and economical means of removing these undesirable heavier components from the side cut which involves the usage of a small adsorption column distinct from, yet related to, the main column. This modified apparatus design is shown in Figure 3 which also illustrates the process of stripping the charcoal in a stripping section detached from the adsorption column. The purifier is operated simply by withdrawing a portion of the charcoal from the bottom of a number of the cooling tubes in the main adsorption column. The charcoal passes through the side cut purifier into the bottom of the elevator carrying the saturated charcoal to the stripper. If the stripping section is located within the primary adsorption column as shown in Figure 1 the charcoal from the bottom of the side cut purifier may be introduced therein in a manner similar to its removal from the primary column. The side cut from the primary column containing a portion of heavier components is fed directly into the central portion of the side adsorber, and the purified side cut is disengaged at the top of the purifier. The purification is accomplished by introducing into the lower portion of the purifier or secondary adsorption column a part of the make gas from the stripping section to serve as reflux in the purification.

Another modification in the design and operation of a continuous charcoal adsorption plant is shown in Figure 3 in which the process of adsorption and stripping are separated into two distinct columns. In the primary adsorption column the cooler is at the top with adsorption and rectifying zones directly below. The saturated charcoal is carried from the bottom of the rectifying zone to the top of the stripping column by elevators, as shown in the drawing, by gas-lift or the like, steam stripped and carried back to the top of the adsorption column either by elevator, gas-lift or the like.

The usage of separate and distinct adsorption and stripping columns gives rise to a number of advantages over the more conventional one column operation. Among the major advantages of the separate stripping section is a resultant decrease in the necessary charcoal circulation rate. This is due to a reduction of the temperature at the bottom of the rectifying zone the temperature being for example in the order of 110° F. to 165° F. when employing a predominantly hydrocarbon feed substantially as described, instead of in the range of 190° F. to 210° F. as is the case in the one column design due to the presence of steam directly adjacent to the rectifying zone. This lower temperature, although apparently not appreciable is significant inasmuch as the adsorption capacity of the charcoal may be increased as much as about 25% to 60%. Further, the two-column operation will permit the use of considerably higher steam rates with a consequent reduction in the required temperature of the steam, the low stripping temperatures being preferable due to the possibilities of using the steam as heating means for the stripper, eliminating the necessity of using high temperature flue gas, and also tending to minimize any polymerization or side reactions which might occur within the saturated charcoal at higher stripping temperatures. Operational and construction costs can be reduced and automatic control equipment is more accurate in the absence of temperature fluctuations in the rectifying zone brought about by the presence therein of any steam.

The principles involved in the modification of purifying the side cut and separate steam stripping may be clarified by reference to Figure 3. Referring to Figure 3 feed gas is introduced to the adsorption section 120 of the adsorption column 122 by means of line 123 controlled by valve 124 and is distributed within the adsorption section 120 by means of disengager 125. Again this and other disengagers used in the process may be any conventional type such as tube bundles as shown in the drawings. A solid bed of granular charcoal is caused to flow downwardly through the adsorption column as before at such a rate that substantially all of the intermediate and heavier components of the feed are adsorbed in the charcoal in the adsorption section 120, while the lighter components of the feed pass upwardly therein and are withdrawn from the adsorption section by means of line 126 controlled by valve 127. The saturated charcoal passes from the adsorption section 120 through the disengager 125 into rectifying section 128 wherein equilibrium is established between the lighter components of the feed which may have been adsorbed and the intermediate and heavier components by refluxing the charcoal with intermediate components which are released from the charcoal at a point lower in the column. Thus in the rectification section 128 any residual lighter components which may have been adsorbed on the downwardly flowing charcoal are desorbed by virtue of the selective adsorption of the intermediate components which are caused to pass upwardly through disengaging section 129 into the rectification section 128.

The charcoal substantially free of such lighter components passes from the rectification section 128 through the disengaging section 129 into a secondary rectification section 130. In the second rectification section 130 the charcoal is refluxed with the heavier components of the feed to effect the selective desorption of the intermediate components, the level of the heavier component reflux being controlled at any desired point within the rectification section by means of a temperature control point or the like. By introducing heavier components into the rectification section 130 to serve as reflux therein the intermediate components are desorbed due to the preferential adsorption of the heavier components and the intermediate components therefore migrate upwardly in the section insuring thereby the continued retention on the charcoal flowing downwardly from rectification section 128 of substantially all of the heavier components. In this manner a heart cut comprising essentially intermediate components may be withdrawn from the top of rectification section 130 by means of line 131 controlled by valve 132 which side cut is comparatively free of either lighter or heavier components. To further insure the production of a side cut containing a minimum of lighter components as impurities, valve 132 is so controlled that a portion of the intermediate components desorbed in the rectification section 130 are forced to pass upwardly through the disengaging section 129 into the initial rectification section 128 therein selectively desorbing the lighter components which may be adsorbed by the charcoal as above described. The side cut, according to the drawing is further purified in the purification column 134 as hereinafter described.

In the primary adsorption column 122 the charcoal substantially free of intermediate and lighter components passes from the rectification section 130 through disengager 135 and charcoal feed controller 136 into the lower portion of the adsorption column. At disengager 135 heavier components of the feed are introduced by means of line 137, controlled by valve 138 to serve as reflux as above described in the rectification section 130. The charcoal passing through the charcoal flow controller 136 passes through sealing leg 138 and transfer line 139 into the charcoal elevator 140. The length of sealing leg 138 is dependent upon the type of flow controller employed. In the drawing, a level control 141 is shown whereby the length of the sealing leg 138 may be kept at a minimum by virtue of the fact that a build up of the charcoal is induced at the bottom of the adsorption column. The drawing shows the use of one type of charcoal flow controller, but we do not intend to be limited thereby as any type of controller may be employed such as for example a rotating vane or the like.

The charcoal passing through transfer line 139 is picked up by elevator 140 and deposited in transfer line 142 wherein it flows into the top of the stripping column 144. Stripping column 144 consists essentially of a tube bundle heated by flue gas, steam or the like and appropriate disengagers for the removal of the stripping gas and for the introduction of the stripping steam. Thus the charcoal flowing through transfer line 142 falls into the collecting chamber 145, passes through the disengager 146 and downwardly through the tube bundle 148 into the bottom of the stripping column. Flue gas, steam or other medium is injected into the column by means of line 149 heating the tube bundle therein and is removed by means of line 150. Stripping steam is introduced at disengager 148 by means of line 151 passing upwardly through tube bundle 147 stripping the adsorbed gaseous components from the charcoal, the steam-stripped gas mixture passing out of the column by means of line 152 located at disengager 146. The steam-gas mixture is passed into condenser 153 wherein the steam is condensed from the gaseous mixture being withdrawn as water by means of line 154. The gases pass from condenser 153 into line 155 controlled by valves 156 and 157. A portion of these gaseous components, which are substantially completely the heavier components of the feed, are caused to flow from line 155 through valve 157 into line 158, and are picked up by blower 159 and forced through line 160 back to the adsorption and purifying columns to serve as reflux as described. The remainder of the make gas from line 155 passes through valve 156 and line 161 to production.

Returning to the stripping column 144 the charcoal passing through the lower disengager 148 flows through transfer line 162 to a second elevator 164 wherein it is deposited in transfer line 165 flowing therefrom into the top of the adsorption column 122. The charcoal flowing through transfer line 165 may pass directly into the cooling section 166 as shown in the drawing or alternatively into a hopper opening into the cooling section. In the cooling section 166 the charcoal is cooled to the desired temperature, which cooling is minimized by the usage of a separate stripping column because of the possibility of reduced steam temperatures as hereinbefore described and from the cooling section, a major portion of the charcoal flows into the adsorption section 120 to complete the cycle. However, it is at this point that the purifying column 134 becomes related to the adsorption column which is accomplished by withdrawing a portion of the charcoal from certain of the cooling tubes of cooling section 166 in the adsorption column 122 and causing this charcoal to flow through transfer line 177 into the top of the purification column 134. Purification column 134 is comprised essentially of an adsorption section, a rectification section, suitable disengagers and a flow controller the same or different from the flow controller in the adsorption column 122. The side cut removed from the primary adsorption column 122 by means of line 131 controlled by valve 132 and comprising essentially intermediate components of the feed gas is introduced into purification or secondary adsorption column 134 at disengager 178 separating adsorption section 179 from rectification section 180. A portion of the intermediate components comprising a major part of the side cut and substantially all of the heavier components which may be present as impurities in the side cut are adsorbed in the downwardly flowing charcoal in the adsorption section 179 and pass therewith through disengager 178 into the rectification section 180. Heavier components are introduced into rectification section 180 at disengager 181 by means of line 182 controlled by valve 183. In the drawing, this heavier component reflux is furnished from the reflux blower 159 which draws a portion of the heavier components from the stripper-make gas. The heavier components introduced into rectification section 180 serve to desorb the intermediate components which may pass with the charcoal from adsorption section 179 through disengager 178 into the rectification section 180. In this manner the unadsorbed and desorbed gases passing out of the purification column by means of line 184 controlled by valve 185 represent a purified side cut which will contain a higher proportion of the intermediate components than the side cut obtained from the primary adsorption column 122 which is feed for the purification column 134.

The charcoal substantially saturated with heavier components passes through the disengaging section 181 in the purification column 134, the rate of flow of which is controlled by flow controller 186, and flows through sealing leg 187 and transfer line 188 to the charcoal elevator 140 wherein it is conveyed to the stripping section and is commingled therein with the charcoal flowing from the bottom of the adsorption column 122. The purification column 134 may utilize any type of charcoal flow controller the length of sealing leg 187 being dependent thereon and may be equipped with a level control such as level control 190 in the drawing.

It is to be understood that the modifications in our process as described with reference to Figure 3 are not intended to limit the broad principles of our invention as hereinbefore disclosed and further are not intended to limit our invention to those modifications enumerated inasmuch as others may occur to those skilled in the art from the foregoing description and illustration. Further, it should be understood that these modifications in the charcoal adsorption process are interchangeable and are not completely interdependent. Thus, it may be desirable to employ a separate steam stripping column as disclosed in Figure 3 without employing a side cut purification column and conversely it may be desirable to employ the side cut purification column without employing a separate and distinct steam stripping column. Thus the side cut purification column 134 may be utilized in conjunction with the adsorption column as described in Figure 1. It should be pointed out that the purification column of the present invention is definitely related to the primary adsorption column inasmuch as the charcoal flow is derived therefrom thus eliminating the necessity of extra coolers and elevators and the charcoal flow from the purification column is again mingled with the main body of charboal from or in the primary adsorption column prior to the stripping thereof thus eliminating the necessity of separate stripping sections for each column. Further, if the purification column is desired or necessary according to our invention it becomes an integral part of the adsorption process and of the primary adsorption column and as such varies distinctly from what might be considered to be a simple two-stage adsorption process wherein the functions such as cooling and stripping in the two stages are independent and unrelated.

Also it may be desirable to include in the primary adsorption column 122 as shown in Figure 3 the improved side cutting apparatus as shown in Figure 2 wherein the adsorption and two rectification sections of the adsorption column 122 would be replaced by one large side cutting apparatus according to Figure 2, or by a bundle of smaller side cutters having the effect of obtaining one side cut comprising the intermediate components of the feed. Further, the column may be so divided as to provide a third or even greater number of rectification sections or to contain two or even more side cutting units or bundles so as to obtain from the feed in either case two or more side cuts or heart cuts. If two or more side cuts are obtained it may be desirable to employ two or more purification columns for these side cuts which may be conveniently accomplished by withdrawing from the parent or primary adsorption column other streams of charcoal to feed these additional purification columns or by flowing the charcoal from one purification column into a subsequent purification column wherein the charcoal from the first purification column will contain substantially completely the components to be purified in the second purification column and so on. The charcoal from these columns may then be returned to the main body of charcoal either in the stripping section of the primary column or as in Figure 3 to a separate stripping column.

Therefore it is to be understood that many modifications in the operation of the adsorption unit may be employed without departing from the features of the present invention which is directed primarily to a method of operation and an apparatus whereby a heart cut may be obtained in a gaseous separation by selective adsorption and improved techniques in the adsorption process itself whereby more efficient operation is obtained. Having described and illustrated my invention, I claim:

1. An apparatus for the separation of a gaseous mixture by selective adsorption which comprises means for contacting said gaseous mixture with a solid adsorbent in an adsorption section thereby adsorbing more readily adsorbable constituents of said gaseous mixture on said adsorbent, means for removing unadsorbed gases from said adsorption section, and means for stripping adsorbed gases from said adsorbent in a stripping section, said last-named means comprising a stripping section having a contacting part and a heating part, means for passing said adsorbent successively through said contacting part and said heating part, means for passing a stripping gas through said adsorbent in both parts of said stripping section, and means for indirectly heating said adsorbent only in said heating part.

2. In a process in which a gaseous mixture is separated by means of selective adsorption of one fraction of the gas on a solid adsorbent, and said adsorbed fraction is liberated in a stripping zone by the combined action of heat and stripping gas, the improvement which comprises passing the enriched adsorbent first through the upper part of a stripping zone in which it is subjected to counter-current contact with said stripping gas in the absence of indirect heating, and then through the lower part of said stripping zone where it is contacted with said stripping gas in the presence of indirect heating.

3. A process according to claim 2 in which the adsorbent is charcoal and the stripping gas is steam.

4. In an apparatus for the continuous separation of normally gaseous mixtures by selective adsorption on a continuous moving bed of solid granular adsorbent wherein means are provided for returning a portion of at least one of the product gases to the apparatus as reflux, the improvement which comprises means for controlling the flow rate of said reflux by means of a temperature control point within the moving bed.

5. In a process for the continuous separation of normally gaseous mixtures by selective adsorption on a solid granular adsorbent wherein a portion of at least one of the product gases is employed as reflux, the improvement which comprises controlling the flow rate of said reflux in accordance with a temperature break present in the moving bed of solid granular adsorbent.

6. A process according to claim 5 in which the adsorbent is charcoal.

7. A process for the separation of a gaseous mixture by selective adsorption on a granular adsorbent which comprises establishing a cyclic flow of adsorbent through a system comprising successive zones of adsorption, rectification, and stripping, adsorbing more readily adsorbable constituents of said gaseous mixture on the adsorbent in the adsorption zone, withdrawing unadsorbed gas from the system as lean gas, stripping adsorbed gas from the adsorbent in the stripping zone, withdrawing stripped adsorbed gas from the system as rich gas, forcing a portion of the stripped adsorbed gas into the rectification zone as reflux, and controlling the amount of said reflux by means of a temperature control point within the rectification zone.

8. A process according to claim 7 in which the adsorbent is charcoal.

9. An apparatus for the selective adsorption of gases which comprises a column containing a cooling section near the upper end thereof, an adsorption section, a rectification section, and a stripping section successively below said cooling section, an adsorbent feeding apparatus below said stripping section, a sealing leg below said feeding zone, means for maintaining a constant level of solid adsorbent between the bottom of said sealing leg and said feeding section, means for elevating solid adsorbent removed from said sealing leg to said cooling section, means for introducing a gaseous mixture between said adsorption section and said rectification section, means for withdrawing unadsorbed gases from above said cooling section, means for introducing stripping gas into said stripping section, and means for removing gas from between said stripping section and said rectification section.

10. An apparatus for the separation of a gaseous mixture by selective adsorption on a granular adsorbent which comprises a column having a cooling section near the upper end thereof, and successively below said cooling section an adsorption section, a rectification section, and a stripping section, said cooling, adsorption, rectification and stripping sections communicating with each other through gas disengagers so as to direct the flow of a solid moving bed of adsorbent downwardly by gravity through and between said sections and distribute a countercurrent flow of gas through and between said sections, a sealing leg at the bottom of said column, means for elevating the solid adsorbent from below the bottom of said sealing leg to the top of said column, means for introducing said gaseous feed into the column at the disengager just below the adsorption section, means for removing unadsorbed gas from the column at the disengager just above the adsorption section, additional means for removing unadsorbed gas from the column above said cooling section, means for indirectly cooling said adsorbent in said cooling section, means for indirectly heating the adsorbent in the lower portion of said stripping section, means for introducing a stripping gas into said stripping section so as to contact the adsorbent in both the upper and the lower portions thereof, means for withdrawing desorbed gases from the column at the disengager just above said stripping section, means for controlling the rate of said withdrawal by means of a temperature control point within the rectification section, and means for withdrawing small amounts of stripping gas from the bottom of said sealing leg.

11. A process for the separation of a gaseous mixture by selective adsorption on a granular adsorbent which comprises establishing a cyclic flow of adsorbent through a system comprising successive zones of cooling, adsorption, rectification, stripping and sealing, cooling the adsorbent in said cooling zone, adsorbing more readily adsorbable constituents of said gaseous mixture on the adsorbent in said adsorption zone, withdrawing unadsorbed gas from the system as lean gas, forcing a portion of the unadsorbed gas to pass countercurrently to the adsorbent through the cooling zone as a drying gas, stripping a major proportion of the adsorbed gas from the adsorbent in the first part of the stripping zone by contacting the adsorbent with a stripping gas in the absence of indirect heating, and stripping additional adsorbed gas from the resulting partially stripped adsorbent in a second part of the stripping zone by contacting the adsorbent with stripping gas while also subjecting it to indirect heating, withdrawing stripped adsorbed gas from the system as rich gas, and forcing a portion of the stripped adsorbed gas into said rectification zone as reflux.

12. A process according to claim 11 in which the adsorbent is activated charcoal and the stripping gas is steam.

13. In an apparatus for the separation of gaseous mixtures by selective adsorption which comprises an adsorption column provided with an adsorption section and a stripping section, means for permitting a solid adsorbent to pass successively through said adsorption section and said stripping section, means for introducing said gaseous mixture into said adsorption section, means for withdrawing unadsorbed gases from said adsorption section, and means for withdrawing stripped gases from said stripping section, the improvement which comprises a primary rectification section and a secondary rectification section successively inserted between said adsorption section and said stripping section, and means for withdrawing a gaseous fraction from said secondary rectification section.

14. In an apparatus for the separation of gaseous mixtures by selective adsorption comprising an adsorption column provided with an adsorption zone, a stripping zone and a cooling zone with means for substantially preventing undesirable gaseous flow between said stripping and cooling zones, means for introducing said gaseous mixture to said adsorption zone, means for removing unadsorbed components of said gaseous mixture from said adsorption zone, means for removing adsorbed components of said gaseous mixture from said stripping zone, passages permitting solid adsorbent to flow downward by gravity successively through said adsorption, stripping, and cooling zones, and means for conveying the adsorbent from below the lowermost of said zones to above the uppermost of said zones, the improvement comprising the inclusion of a primary rectification zone and a secondary rectification zone successively disposed between said adsorption zone and said stripping zone in said adsorption column and formed therein by means of disengaging sections separating said rectification zones from said adsorption zone and said stripping zone and from each other, and means for removing from the secondary rectification zone a fraction of said gaseous mixture to be separated.

15. An apparatus for the separation of gaseous mixtures by selective adsorption which comprises an adsorption column having a cooling section near the top thereof, and successively below said cooling section, an adsorption section, a primary rectification section, a secondary rectification section, and a stripping section; means for introducing a solid adsorbent into the top of said column, means for removing granular adsorbent from the bottom of said column without permitting excessive gaseous flow therewith, means for returning said granular adsorbent to the top of said column, means for introducing a gaseous feed into the lower part of said adsorption section, means for removing a lean gas from the upper part of said adsorption section, means for removing a side-cut gas from the upper part of said secondary rectification section, means for introducing a stripping gas into the lower part of said stripping section, means for removing said stripping gas and a rich gas from the upper part of said stripping section, means for indirectly cooling said adsorbent in said cooling section, and means for indirectly heating said adsorbent in said stripping section.

16. A process for the separation of a gaseous feed mixture to obtain primary, secondary, and tertiary gas fractions of successively higher adsorbability, which comprises establishing a continuous cyclic flow of solid adsorbent downwardly through zones of cooling, adsorption, rectification and stripping, successively, and upwardly from below the stripping zone to above the cooling zone, introducing feed into the lower part of the adsorption zone, introducing tertiary gas reflux into the rectification zone, and removing said primary, secondary, and tertiary gas fractions from the upper part of the adsorption zone, the rectification zone, and the stripping zone, respectively.

17. A process according to claim 16 in which a portion of the primary gas fraction is passed through the cooling zone in countercurrent contact with the adsorbent.

18. In a process for the separation of a gaseous mixture by selective adsorption to obtain at least three fractions of successively higher adsorbability on a solid adsorbent, in which process a solid adsorbent is recirculated through a circuit comprising an adsorption zone and a stripping zone, said gaseous mixture is contacted with said adsorbent in said adsorption zone so as to adsorb the more readily adsorbable components therefrom, leaving the unadsorbed gas as a primary fraction, and an enriched adsorbent is stripped in said stripping zone to remove therefrom the most readily adsorbable constituents as a tertiary fraction, the improvement which comprises inserting successively a primary rectification zone and at least one secondary rectification zone between said adsorption zone and said stripping zone, employing a countercurrent reflux of successively greater degree of adsorbability in each of said rectification zones, and withdrawing a secondary fraction from at least one of said secondary rectification zones.

19. A process for separating a gaseous mixture containing gases of differing adsorbabilities into at least three fractions, the primary fraction containing the gases of lower adsorbability, the secondary fraction containing gases of intermediate adsorbability and the tertiary fraction containing gases of higher adsorbabilities, which comprises contacting said gaseous mixture with a solid adsorbent to cause adsorption of gases of intermediate adsorbability and gases of higher adsorbability while leaving gases of lower adsorbability as unadsorbed gases, separating said unadsorbed gases from said solid adsorbent containing said gases of intermediate and higher adsorbability, passing said solid adsorbent containing said gases of intermediate and higher adsorbability through a rectification zone into a stripping zone, stripping said gases of higher adsorbability from said solid adsorbent in said stripping zone, withdrawing one portion of said stripped gases of higher adsorbability from said stripping zone, returning another portion of said stripped gases of higher adsorbability to said rectification zone to effect displacement of said gases of intermediate adsorbability from said solid adsorbent in said rectification zone, and withdrawing said gases of intermediate adsorbability from said rectification zone.

20. A process according to claim 19 in which the steps of stripping and return of stripped gases are carried out by heating the solid adsorbent in the stripping zone while passing a stream of steam countercurrently through it, removing a mixture of steam and stripped gases from the stripping zone, cooling this mixture to condense the steam, separating the water, and returning a portion of the dry stripped gases as reflux to the rectification zone.

21. A continuous process for the separation of a gaseous mixture into at least three fractions which comprises contacting said mixture with a moving bed of granular solid adsorbent in an adsorption zone so as to cause adsorption of the more readily adsorbable components of said gaseous mixture by the adsorbent, separating the unadsorbed components from the enriched adsorbent as a primary fraction of said gaseous mixture, desorbing a secondary fraction of the adsorbed components from the enriched adsorbent by contacting said enriched adsorbent with a tertiary fraction of said gaseous mixture in a rectification zone, separating the thus desorbed secondary fraction of said gaseous mixture from the adsorbent and removing said secondary fraction from said rectification zone, stripping the tertiary fraction of said gaseous mixture from the adsorbent in a stripping zone by heating said enriched adsorbent while it is moving continuously downward countercurrent to a stream of stripping gas passing therethrough, causing a portion of the resultant stripped tertiary fraction to flow countercurrently to the granular adsorbent in said rectification zone so as to effect the selective desorption of said secondary fraction of said gaseous mixture, withdrawing the remainder of the stripped tertiary fraction from said stripping zone, withdrawing the stripped adsorbent from the stripping zone, and cooling the stripped adsorbent in a cooling zone from whence it is caused to flow into said adsorption zone.

22. A process according to claim 21 in which the granular solid adsorbent is activated charcoal.

23. A continuous process for the recovery of $C_2$ hydrocarbons from a gaseous mixture which also contains other gaseous hydrocarbons of lower and higher molecular weight than said $C_2$ hydrocarbons as well as non-hydrocarbon gases which comprises contacting said mixture with a moving bed of granular solid adsorbent in an adsorption zone so as to cause adsorption of the more readily adsorbable components of said gaseous mixture by the adsorbent, separating the unadsorbed components from the enriched adsorbent as a primary fraction of said gaseous mixture said fraction comprising predominantly lower molecular weight hydrocarbons than said $C_2$ hydrocarbons as well as non-hydrocarbon gases, desorbing the $C_2$ hydrocarbons as a secondary fraction from the enriched adsorbent in a rectification zone by contacting said enriched adsorbent with a tertiary fraction of said gaseous mixture, comprising heavier molecular weight hydrocarbons than said $C_2$ hydrocarbons, separating the thus desorbed secondary fraction of said gaseous mixture from the resulting adsorbent and removing said secondary fraction from said rectification zone, stripping the tertiary fraction of said gaseous mixture from the resulting adsorbent by heating said adsorbent while it is moving continuously countercurrent to a stream of stripping gas passing therethrough, causing a portion of the resultant stripped tertiary fraction to flow countercurrently to the granular adsorbent in said rectification zone to effect the selective desorption of said secondary fraction of said gaseous mixture and the selective adsorption of said tertiary fraction of said gaseous mixture on the downwardly flowing adsorbent, separating the remainder of the stripped tertiary fraction from said adsorbent, withdrawing said separated tertiary fraction from the stripping zone and conveying the stripped adsorbent from the stripping zone to a cooling zone from whence it is caused to flow into said adsorption zone.

24. A process according to claim 23 in which the granular adsorbent is activated charcoal.

25. A process for separating a gaseous mixture which comprises blowing a granular adsorbent by means of lean gas to the top of an adsorption column, separating said lean gas from said adsorbent, allowing said adsorbent to flow downward by gravity through successive zones of cooling, adsorption rectification and stripping, indirectly cooling said separated adsorbent in said cooling zone, passing said gaseous mixture countercurrently to said cooled adsorbent in said adsorption zone and adsorbing gases of intermediate and higher adsorbability from said mixture while leaving lean gas of lower adsorbabilities substantially unadsorbed, separating in said stripping zone said gases of higher adsorbabilities from said adsorbent, removing one portion of said gases from said stripping zone, passing another portion of said separated gases into said rectification zone and displacing therein gases of intermediate adsorbability from said adsorbent, withdrawing from said rectification zone said gases of intermediate adsorbability, withdrawing stripped adsorbent from said stripping zone, and returning a portion of said lean gases separated from said adsorbent in said adsorption zone for blowing said adsorbent removed from said stripping zone to the top of said column.

26. A process for separating a gaseous mixture containing gases of differing adsorbability into a plurality of fractions differing from each other by the adsorbability thereof which comprises blowing a granular adsorbent by means of a gas fraction of lowest adsorbability to the top of an adsorption column, separating said gas fraction of lowest adsorbability from said adsorbent, allowing said adsorbent to flow downward by gravity through successive zones of cooling, adsorption, primary rectification, at least two zones of secondary rectification, and stripping, indirectly cooling said separated adsorbent in a cooling zone, passing said gaseous mixture countercurrently to said adsorbent in said adsorption zone and adsorbing gases of higher adsorbability while leaving the gases of lowest adsorbability substantially unadsorbed, countercurrently contacting said adsorbent with reflux gases of successively higher adsorbability in said primary rectification zone and said secondary rectification zones, stripping gases of highest adsorbability remaining on said adsorbent in said stripping zone with the aid of steam as a stripping gas, withdrawing one portion of said gases of highest adsorbability and returning the remainder to the last of said secondary rectification zones to serve as said reflux therein, withdrawing one portion of each of said gases of intermediate adsorbabilities from each of said secondary rectification zones and returning the remainder of each of said gases of intermediate adsorbability to the next higher rectification zone, removing said stripped adsorbent from said stripping zone, removing said unadsorbed gases of lowest adsorbability from said adsorption zone, and using a portion of said unadsorbed gases of lowest adsorbability for blowing said adsorbent removed from said stripping zone to the top of said adsorption column.

27. An apparatus for the separation of gaseous mixtures by selective adsorption on a solid adsorbent which comprises a column containing an adsorption section near its upper end, and below said adsorption section a primary rectification section and a secondary rectification section, passages for permitting said solid adsorbent to flow downward through said column, means for introducing said gaseous mixture into the lower part of said adsorption section, means for withdrawing unadsorbed lean gas from the upper part of said adsorption section, tubular means within said column forming two successive separate rectification sections for by-passing a portion of said adsorbent from a point within said adsorption section above the point of introduction of said gaseous mixture, through said separate rectification sections into the upper part of said secondary rectification section, and means for withdrawing a purified side-cut from between said separate rectification sections.

28. An apparatus according to claim 27 in which there is a stripping section within the column below said secondary rectification section, which is equipped with means for indirectly heating the solid adsorbent while passing a countercurrent stream of steam therethrough and means for removing the stripped gases, and there is also a cooling section within the column above said adsorption section, which is equipped with means for indirectly cooling the adsorbent.

29. An apparatus for the separation of a gaseous mixture by selective adsorption and desorption in a moving bed of granular adsorbent which comprises an adsorption column provided with a cooling section near the top thereof, and successively below said cooling section an adsorption section, a primary rectification section, a secondary rectification section, and a stripping section, passages for permitting said granular adsorbent to flow downward through said column, a vertical tertiary tube open at both ends disposed within said column and extending from a point within said adsorption section to a separate rectification section above said secondary rectification section, primary tubular means surrounding a portion of the upper part of said tertiary tube, said primary tubular means being closed only at its upper end so as to form a feed disengager for distributing feed gas into the solid adsorbent stream, means for introducing said gaseous mixture into said feed disengager, secondary tubular means extending farther within said secondary rectification section than said tertiary tube, so as to form said separate rectification section and to separate the adsorbent flowing from said separate rectification section to said secondary rectification section from the adsorbent flowing from said primary rectification section to said secondary rectification section, said secondary tubular means surrounding the lower end of said tertiary tube and being closed at its upper end so as to form a side-cut disengager for separating desorbed side-cut gases from the solid adsorbent, means for removing said side-cut gases from said side-cut disengager, means for heating said adsorbent and stripping adsorbed gases therefrom in said stripping section, and means for removing non-adsorbed gases and stripped gases from said adsorption section and said stripping section respectively.

30. An apparatus according to claim 29 in which the primary, secondary and tertiary tubular means comprise bundles of tubes all enclosed within the adsorption column.

31. In a process for the separation of a gaseous mixture to obtain primary, secondary and tertiary gas fractions of successively greater degrees of adsorbability on a solid adsorbent, wherein said adsorbent is passed through a cyclic path comprising an adsorption zone, a primary rectification zone, a secondary rectification zone, and a stripping zone, successively, said gaseous mixture is introduced into the adsorption zone, said primary gas fraction is removed from said adsorption zone, and said tertiary gas fraction is withdrawn from said stripping zone, the improvement which comprises separating a portion of said adsorbent at a point in said adsorption zone at which the adsorbent is substantially free from adsorbed tertiary gas fraction, passing the separated adsorbent through two successive separate rectification zones into said secondary rectification zone, and withdrawing a purified secondary gas fraction from the latter of said separate rectification zones.

32. A process according to claim 31 in which the rate of withdrawal of the tertiary gas fraction is restricted so as to force a portion thereof to enter the secondary rectification zone to act as reflux therein and serve to selectively desorb secondary gas fraction therein, and the rate of withdrawal of the purified secondary gas fraction is restricted so as to force a portion thereof to enter the first of said separate rectification zones to act as reflux therein and serve to selectively desorb primary gas fraction therein.

33. In a process for the separation of a gaseous mixture to obtain primary, secondary and tertiary gas fractions of successively greater degrees of adsorbability on a solid adsorbent, wherein said adsorbent is passed through a cyclic path comprising a cooling zone, an adsorption zone and a stripping zone, successively, and said gaseous mixture is introduced into the adsorption zone, and said primary gas fraction is removed from said adsorption zone, the improvement which comprises inserting a primary rectification zone and a secondary rectification zone in said cyclic path between said adsorption zone and said stripping zone, separating a portion of the adsorbent from the adsorption zone at a point at which the adsorbent is substantially free from adsorbed tertiary gas fraction, passing this portion through a separate rectification zone in which it is subjected to a reflux of purified secondary gas fraction sufficient to desorb any primary gas fraction adsorbed thereon, passing the resulting adsorbent through an additional separate rectification zone into said secondary rectification zone wherein it is combined with the non-separated portion of the adsorbent and the combined adsorbent is subjected to a reflux of said tertiary fraction so as to desorb an impure secondary gas fraction therefrom, passing a portion of said desorbed impure secondary gas fraction into said additional separate rectification zone, withdrawing a portion of purified secondary gas fraction from said additional separate rectification zone and causing the remainder to pass into said separate rectification zone to act as said reflux therein, causing the remainder of said impure secondary gas fraction desorbed in said secondary rectification zone to pass into said primary rectification zone to act as reflux therein and thereby desorb any primary gas fraction remaining adsorbed on the adsorbent therein, stripping said tertiary gas fraction from said adsorbent in said stripping zone, withdrawing a portion of said stripped tertiary gas fraction, and causing the remainder to pass into said secondary rectification zone to act as said reflux therein.

34. A process according to claim 33 in which the solid adsorbent is charcoal and the stripping is accomplished with the aid of a countercurrent flow of steam.

35. A process for the separation of a gaseous feed mixture to obtain primary, secondary and tertiary gas fractions of successively higher adsorbability, which comprises establishing a continuous cyclic flow of solid adsorbent downwardly through zones of cooling, adsorption, primary rectification, secondary rectification and stripping, successively, and upwardly from below the stripping zone to above the cooling zone, introducing feed into the lower part of the adsorption zone, removing said primary and said tertiary gas fractions from the upper part of the adsorption zone and the stripping zone respectively, separating a portion of the adsorbent from the adsorption zone at a point at which the adsorbent is substantially free from adsorbed tertiary gas fraction, but contains both primary and secondary adsorbed gas fractions, passing this portion through a separate rectification zone in which it is subjected to a reflux of secondary gas fraction sufficient to desorb the primary gas fraction and leave only the substantially pure adsorbed secondary gas fraction, discharging the resulting adsorbent into a portion of the secondary rectification zone, and there subjecting it to a reflux comprising said tertiary gas fraction, so as to desorb the substantially pure secondary gas fraction, which is withdrawn.

36. An apparatus for the separation of gaseous mixtures by selective adsorption and desorption in a moving bed of granular solid adsorbent which comprises a primary adsorption column, an auxiliary adsorption column, and a stripping column, said primary adsorption column being provided with a cooling section, an adsorption section, a primary rectification section and secondary rectification section, said adsorption and rectification sections being disposed within the column in such a manner that the adsorbent flowing downward through said column passes from the cooling section through the adsorption section and each rectification section, disengaging sections separating said cooling, adsorption and rectification sections from each other. said auxiliary adsorption column being provided with an auxiliary adsorption section and an auxiliary rectification section with disengagers separating these sections, and said stripping column comprising a tube bundle through which said adsorbent flows countercurrently to stripping gas while it is being heated therein, means for conveying the enriched adsorbent from the bottoms of both the primary and the auxiliary adsorption columns to the top of the stripping column, means for removing the stripped gases from the stripping column, means for returning one portion of these stripped gases to the last rectification section of said primary adsorption column to serve as reflux therein, means for returning another portion of said stripped gases to said auxiliary rectification section to act as reflux therein, means for conveying the stripped adsorbent from the bottom of said stripping column to the top of the cooling section in said primary adsorption column, means for conveying a portion of the cooled adsorbent from the bottom of the cooling section of said primary adsorption column to the top of said auxiliary adsorption column, means for introducing gaseous feed into the adsorption section of said primary adsorption column, means for withdrawing a side cut fraction of said gaseous feed from the secondary rectification section of said primary adsorption column, means for introducing said side cut fraction into the adsorption section of said auxiliary adsorption column, and means for withdrawing a purified selected fraction of said gaseous feed from the upper part of said auxiliary adsorption column.

37. A process for the separation of a gaseous feed mixture to obtain primary, secondary, and tertiary gas fractions of successively higher adsorbability which comprises establishing a continuous cyclic flow of solid adsorbent downwardly through zones of cooling, adsorption, primary rectification, secondary rectification and stripping, successively, and upwardly from below the stripping zone to above the cooling zone, removing said primary and said tertiary gas fractions from the upper part of the adsorption zone and the stripping zone respectively, removing an impure secondary fraction from the upper part of said secondary rectification zone, contacting said impure secondary gas fraction in a separate purification zone with additional solid adsorbent to remove the impurities therefrom, withdrawing the purified secondary fraction, and passing the resulting adsorbent through an additional separate rectification zone to said stripping zone.

38. A continuous process for the separation of gaseous mixtures by selective adsorption and desorption to obtain primary, secondary and tertiary fractions therefrom, which comprises establishing two continuous cyclic streams of granular adsorbent, one of which streams is passed successively through a primary adsorption zone, a primary rectification zone and a secondary rectification zone, and the other of which streams is passed successively through an auxiliary adsorption zone and an auxiliary rectification zone, both of which streams are combined thereafter and passed successively through a stripping zone and a cooling zone and then separated for repassage through said adsorption and rectification zones; contacting said gaseous mixture with said adsorbent in said primary adsorption zone so as to cause adsorption of more readily adsorbable components thereon, withdrawing non-adsorbed gases from said primary adsorption zone as said primary fraction, countercurrently contacting the so enriched adsorbent in said primary rectification zone with an impure secondary fraction reflux, countercurrently contacting the resulting adsorbent in said secondary rectification zone with a tertiary fraction reflux so as to desorb therefrom an impure secondary fraction, returning a portion of said desorbed impure secondary fraction to said primary rectification zone to act as said reflux therein, withdrawing the remainder of said impure secondary fraction from said secondary rectification zone, contacting said withdrawn impure secondary fraction with said adsorbent in said auxiliary adsorption zone, withdrawing purified secondary fraction from said auxiliary adsorption zone, combining the adsorbent withdrawn from said auxiliary rectification zone with the adsorbent withdrawn from said secondary rectification zone as previously described, stripping residual adsorbed gases from the combined adsorbent in said stripping zone, withdrawing one portion of said stripped gases as said tertiary fraction, returning a second portion of said stripped gases to said secondary rectification zone to act as said reflux therein, and returning a third portion of said stripped gases to said auxiliary rectification zone to act as reflux therein.

39. A process according to claim 38 in which the granular solid adsorbent is activated charcoal.

CLYDE H. O. BERG.

REFERENCES CITED

The following references are of record in the file of this patent:

UNITED STATES PATENTS

| Number | Name | Date |
|---|---|---|
| 1,422,007 | Soddy | July 4, 1922 |
| 1,617,960 | Muller | Feb. 15, 1927 |
| 1,784,536 | Pantenburg | Dec. 9, 1930 |
| 1,825,707 | Wagner | Oct. 6, 1931 |
| 1,836,301 | Bechthold | Dec. 15, 1931 |
| 2,252,550 | Bragg | Aug. 12, 1941 |
| 2,384,311 | Kearby | Sept. 4, 1945 |